United States Patent

[15] 3,661,728

Toledo et al.

[45] May 9, 1972

[54] NICKEL PLATING OF NICKEL-COPPER PRINTED CIRCUIT BOARD

[72] Inventors: Emil Toledo, Natick, Mass.; Dennis R. Sprague, Fountain Valley, Calif.

[73] Assignee: The United States of America as represented by the Secretary of the Navy

[22] Filed: Mar. 31, 1971

[21] Appl. No.: 130,029

[52] U.S. Cl. ..............................204/32 R, 204/29, 204/35 R

[51] Int. Cl. ........................................C23b 1/00, C23b 5/50

[58] Field of Search............................204/29, 32 R, 35 R, 40

[56] References Cited

UNITED STATES PATENTS

| | | | |
|---|---|---|---|
| 2,299,054 | 10/1942 | Harshaw et al | 204/32 R |
| 2,457,059 | 12/1948 | McQuire | 204/32 R |
| 2,457,060 | 12/1948 | McQuire | 204/32 R |
| 2,457,061 | 12/1948 | McQuire | 204/32 R |
| 2,533,533 | 12/1950 | Stoddard | 204/29 X |

*Primary Examiner*—G. L. Kaplan
*Attorney*—R. S. Sciascia, H. H. Losche and Paul S. Collignon

[57] ABSTRACT

A process for plating nickel onto a nickel surface of a printed circuit board containing copper comprising first plating copper from a cyanide copper bath onto said nickel surface and then removing all said plated copper by reverse plating in the same cyanide copper bath and then plating nickel onto said nickel surface.

4 Claims, No Drawings

NICKEL PLATING OF NICKEL-COPPER PRINTED CIRCUIT BOARD

CROSS-REFERENCE TO RELATED APPLICATIONS

Patent application of Emil Toledo entitled, "Nickel Etching and Plating Bath," Ser. No. 855,420, filed Sept. 4, 1969.

BACKGROUND OF THE INVENTION

The present invention relates to a process for electroplating nickel onto a nickel surface and has particular utility in applying a nickel coating onto a nickel-copper printed circuit board.

One of the major problems that must be overcome to obtain good adhesion on a nickel coated printed circuit board is the removal of its passive nickel oxide coating in a manner which will not affect its thin nickel coating. Most mild cleaning methods, such as a HCl dip, do not completely remove the oxide coating and more active cleaning methods, such as electroetching and electropolishing can damage the thin nickel coating on the printed circuit board.

Conventional baths and processes for electroplating nickel are described in "Principles of Electroplating and Electroforming," by Blum and Hogaboom, pages 362–381, revised third edition, 1949, McGraw-Hill Book Co., Inc., New York; and in "Modern Electroplating," edited by A. G. Gray, the Electrochemical Society, 1953, pages 299–355. Almost all baths for electroplating nickel contain nickel sulfate, a chloride, such as nickel chloride, a buffering agent, such as boric acid, and a wetting agent such as sodium lauryl sulfate, sodium lauryl ether sulfate or sodium 7-ethyl-2-methyl-4-undecanol sulfate. Such baths include the well-known Watts bath and other baths containing, as the source of the nickel, a combination of nickel fluoborate with nickel sulfate and nickel chloride, or a combination of nickel fluoborate with nickel chloride.

Various methods have been employed in the past to cleanse the nickel oxide film from a part which is to receive subsequent plating. In U. S. Pat. No. 2,299,054, which issued Oct. 13, 1942, to William J. Harshaw and Kenneth E. Long, there is described an anodic-cathodic treatment for preparing a nickel plated article for chromium plating. The nickel plated article is placed in an aqueous solution of sodium cyanide and connected as an anode while passing an electric current therethrough at a voltage of from 2 to 10 volts for a period of about 1 second. The current is then reversed, by connecting the piece as a cathode for a few seconds.

Another anodic method for cleaning nickel is described in U. S. Pat. No. 3,362,894, which issued Jan. 9, 1968, to William A. Pennington and Stephen D. Cramer. In this patent, a cleaning method for nickel is described wherein a metal substrate is given an anodic treatment in a concentrated aqueous solution of a lithium halide. The metal substrate is then rinsed and plated in a conventional plating bath.

In the above-referenced patent application there is described an improved process for plating nickel onto a nickel surface by providing a bath which serves as both a cleaning bath and a plating bath. The article is first reverse plated, that is, the article is immersed as anode in the bath and, after about one minute of current application, the current flow is reversed and the article is connected as cathode in the bath. Plating is accomplished in the normal manner. This process provides excellent adhesion between nickel layers, however, the process is limited to use with printed circuit boards that do not contain any copper. The presence of copper in a nickel acid bath adversely affects adhesion of platings produced in that bath and, due to the reverse-plating step in the above-referenced application, copper is likely to contaminate the bath if any copper is present in the base material of the printed circuit board.

SUMMARY OF THE INVENTION

The present invention has particular utility when used to plate nickel onto a thin nickel surface of a printed circuit board containing copper. The nickel surface is cleansed by a unique step of first plating copper onto the nickel surface from a cyanide copper bath. After about one minute of plating on the nickel surface of the printed circuit board, the current is reversed by connecting the piece as an anode and the piece is then reverse-plated until all the previously deposited copper is removed. The piece is then nickel plated in a nickel sulfate-nickel chloride bath.

It is therefore a general object of the present invention to provide an improved process of preparing a nickel surface for electroplating by first electroplating copper onto the nickel surface and then removing all the deposited copper by reverse plating in the same bath used for electroplating.

DESCRIPTION OF THE PREFERRED EMBODIMENT

A printed circuit board having a nickel surface is first cleansed, and then plated for about one minute in a cyanide copper bath. The board is then connected as anode and reversed plated in the same cyanide copper bath until all of the copper which has been previously deposited is removed. The board is then given an acid etch and then plated for about 30 minutes in a nickel sulfate-nickel chloride bath, such as a Watts bath.

The following illustrative example is provided in order that one skilled in the art may have a better understanding of practicing the present invention.

EXAMPLE I

A nickel-copper printed circuit board was prepared for plating by first degreasing in acetone for about 1 minute. The nickel surface of the board was then electroplated with copper by immersing in a cyanide copper bath for about 1 minute and then, reverse-plated for about 1 minute while in the same bath, by connecting the board as anode. All the copper previously deposited was removed during the reverse plating step. The cyanide copper bath was comprised as follows:

| | |
|---|---|
| Sodium Cyanide | 100 g/l |
| Copper Cyanide | 70 g/l |
| Sodium Hydroxide | 15 g/l |
| Sodium Carbonate | 25 g/l |

(Free sodium cyanide is adjusted to 23 g/l)

After reverse plating, the board was removed from the cyanide copper bath and then given an acid etch (30% H So –10% $HNO_3$) for 15 seconds. The board was then electroplated in a nickel sulfate-nickel chloride bath for 30 minutes. The plating bath was comprised as follows:

| | |
|---|---|
| Nickel Sulfate | 300 g/l |
| Nickel Chloride | 100 g/l |
| Boric Acid | 35 g/l |
| Saccharine | 1 g/l |
| Sodium lauryl sulfate | 50 mg/l |
| Temperature | 50 degrees C. |

Printed circuit boards which were prepared by the process described in EXAMPLE I produced plating that had excellent adhesion characteristics and, in weld tests, welds with excellent adhesion were produced. It was observed, however, that unless all the plated copper is removed from the nickel coating, the excellent type of adhesion required for weldable boards is not obtained.

We claim:

1. A process for electroplating nickel onto a nickel surface comprising, first plating copper onto said nickel surface in a cyanide copper bath with said nickel surface being connected as cathode and then reverse-plating in the same cyanide copper bath with said nickel surface being connected as anode for sufficient time to remove all copper deposited onto said nickel surface, and then plating in a nickel sulfate-nickel chloride bath with said nickel surface being connected as cathode.

2. A process for electroplating nickel onto a nickel surface as set forth in claim 1 wherein said copper plating is carried on for about 1 minute and said reverse plating is carried on for about 1 minute.

3. A process for electroplating nickel onto a nickel surface as set forth in claim 1 wherein said cyanide copper bath consists of about 100 g./l. of sodium cyanide, about 70 g./l. of copper cyanide, about 15 g./l. of sodium hydroxide, and about 25 g./l. of sodium carbonate, and the balance of water.

4. A process for electroplating nickel onto a nickel surface as set forth in claim 1 wherein said nickel sulfate-nickel chloride bath consists of about 300 g./l. of nickel sulfate, about 100 g./l. of nickel chloride, about 35 g./l. of boric acid, about 1 g./l. of saccharine, and about 50 mg./l. of sodium lauryl sulfate, and the balance of water.

* * * * *